(12) United States Patent
Lagziel et al.

(10) Patent No.: US 8,944,704 B2
(45) Date of Patent: Feb. 3, 2015

(54) TRANSCEIVER SOCKET ADAPTER FOR PASSIVE OPTICAL CABLE

(71) Applicant: Mellanox Technologies Ltd., Yokneam (IL)

(72) Inventors: Rafi Lagziel, Modiin (IL); Nimer Khazen, Ba'ne (IL); Jamal Mousa, Acre (IL)

(73) Assignee: Mellanox Technologies Ltd., Yokneam (IL)

( * ) Notice: Subject to any disclaimer, the term of this patent is extended or adjusted under 35 U.S.C. 154(b) by 0 days.

(21) Appl. No.: 13/898,557

(22) Filed: May 21, 2013

(65) Prior Publication Data

US 2014/0348468 A1    Nov. 27, 2014

(51) Int. Cl.
*G02B 6/36* (2006.01)
*G02B 6/38* (2006.01)
*G02B 6/42* (2006.01)

(52) U.S. Cl.
CPC .............. *G02B 6/381* (2013.01); *G02B 6/4255* (2013.01)
USPC .......................................................... 385/93

(58) Field of Classification Search
CPC .... G02B 6/4204; G02B 6/421; G02B 6/4214; G02B 6/4231; G02B 6/4243; G02B 6/4255; G02B 6/4261
USPC ......................................................... 385/93
See application file for complete search history.

(56) References Cited

U.S. PATENT DOCUMENTS

| 6,256,448 | B1 * | 7/2001 | Shahid ......................... 385/147 |
| 7,452,139 | B2 * | 11/2008 | Wang et al. ..................... 385/92 |
| 2008/0044141 | A1 * | 2/2008 | Willis et al. .................... 385/88 |

OTHER PUBLICATIONS

"Cisco 40GBASE QSFP+ Modules", Data sheet, 7 pages, Oct. 2012.
International Electrotechnical Commission, Standard IEC-61754-7, "Fibre optic interconnectingdevices and passive components—Fibre optic connector interfaces—Part 7: Type MPO connector family", Edition 3.0, 32 pages, Mar. 2008.
International Electrotechnical Commission, Standard IEC-61754-5, "Fibre optic connector interfaces—Part 5: Type MT connector family", Edition 2.0, 32 pages, Jul. 2005.

* cited by examiner

*Primary Examiner* — Ryan Lepisto
(74) *Attorney, Agent, or Firm* — D Kligler I.P. Services Ltd.

(57) ABSTRACT

A communication device includes a mechanical shell, which is configured to be inserted into a Small Form-Factor Pluggable (SFP) receptacle and contains a notch configured to hold a ferrule for mating with a connector of a passive optical cable. The mechanical shell includes molded upper and lower covers, which are joined together along an assembly line. A pair of elastic clips are molded integrally with at least one of the upper and lower covers and are configured to receive and hold the connector when mated with the ferrule. Circuitry within the shell includes electrical terminals configured to mate with corresponding terminals of the receptacle.

22 Claims, 6 Drawing Sheets

US 8,944,704 B2

TRANSCEIVER SOCKET ADAPTER FOR PASSIVE OPTICAL CABLE

FIELD OF THE INVENTION

The present invention relates generally to connection hardware for data communications, and specifically to optical connectors and adapters.

BACKGROUND

Small Form-factor Pluggable (SFP) modules are used in a wide range of telecommunication and data networking applications to interface between a printed circuit board in a piece of network equipment and a network cable (which may be electrical or fiberoptic). Typically, the SFP receptacle is mounted on the printed circuit board with appropriate electrical connections to the circuit traces on the board, and a connector at the end of the cable plugs into the receptacle. The connector itself commonly contains signal conversion circuitry and is therefore referred to as a "transceiver."

QSFP (Quad Small Form-factor Pluggable) I/O connectors are commonly used for high-speed data interconnections. QSFP interconnects provide high port density and enable users to make better use of available linear printed circuit board (PCB) space. Some QSFP transceiver modules are provided with an integral cable, which is permanently connected to the module and may contain electrical conductors or optical fibers. In the latter case, the complete assembly of an optical cable with integral transceiver modules at both ends is referred to as an active optical cable.

Other sorts of QSFP modules do not have an integral cable, but rather contain a socket for a passive optical cable, i.e., a cable that contains only optical fibers without electronic components. For example, Cisco Systems Inc. (San Jose, Calif.) produces QSFP+ transceiver modules that are designed to connect to multiple-fiber push-on (MPO) connectors of a passive optical cable. MPO optical connectors are defined by the IEC-61754-7 standard of the International Electrotechnical Commission. The key component in these connectors is a ferrule having two holes for positioning pins and one or more rows of fiber holes, for accommodating a number of optical fibers, all with positions and sizes that are precisely defined by the standard.

SUMMARY

Embodiments of the present invention provide improved transceiver modules, which are configured for connection to a passive optical cable.

There is therefore provided, in accordance with an embodiment of the present invention, a communication device, including a mechanical shell, which is configured to be inserted into a Small Form-Factor Pluggable (SFP) receptacle and contains a notch configured to hold a ferrule for mating with a connector of a passive optical cable. The mechanical shell includes molded upper and lower covers, which are joined together along an assembly line and which include a pair of elastic clips, which are molded integrally with at least one of the upper and lower covers and are configured to receive and hold the connector when mated with the ferrule. Circuitry within the shell includes electrical terminals configured to mate with corresponding terminals of the receptacle.

The SFP receptacle may be a QSFP receptacle or an SFP+ receptacle, for example, while the connector of the passive optical cable may be a multiple-fiber push-on (MPO) connector or an MT-type connector.

Typically, the circuitry includes at least one circuit element for converting between electrical communication signals on the electrical terminals and optical communication signals in the optical cable. In one embodiment, the device includes an optical cable, which has an end that extends into the mechanical shell and which includes optical fibers, an optical coupling element, connected to the optical fibers and configured to couple the optical communication signals between the at least one circuit element and the optical fibers, and a harness, which is molded around the fibers at the end of the optical cable and has a lip configured to be inserted into the notch in the mechanical shell.

In a disclosed embodiment, the at least one of the upper and lower covers with the pair of elastic clips is die-cast using a three-part mold.

There is also provided, in accordance with an embodiment of the present invention, a method for producing a communication device. The method includes molding upper and lower covers of a mechanical shell, which is configured to be inserted into a Small Form-Factor Pluggable (SFP) receptacle, containing a notch configured to hold a ferrule for mating with a connector of a passive optical cable and including a pair of elastic clips, which are molded integrally with at least one of the upper and lower covers and are configured to receive and hold the connector when mated with the ferrule. Circuitry, including electrical terminals configured to mate with corresponding terminals of the receptacle, is assembled within the shell. The upper and lower covers are then joined together along an assembly line.

The present invention will be more fully understood from the following detailed description of the embodiments thereof, taken together with the drawings in which:

DETAILED DESCRIPTION OF EMBODIMENTS

SFP transceiver modules are complex devices, generally comprising microelectronic and micro-optical components along with precision mechanical elements, all of which must be precisely aligned. The complexity and technical difficulties involved in producing these modules increases still further when the transceiver module is designed as an adapter for a passive optical cable, wherein one end of the module plugs into a corresponding SFP receptacle, while the other contains a socket for the connector (such as an MPO connector) of the optical cable. In modules of this sort that are known in the art, the mechanical shell is generally made up of multiple pieces, which must meet tight manufacturing tolerances and be fitted together precisely during assembly.

Embodiments of the present invention that are described hereinbelow provide SFP modules of simplified design, which meet the relevant mechanical, optical and electronic requirements while reducing the complexity and cost of production. These modules comprise a mechanical shell, which is configured to be inserted into an SFP receptacle. The shell contains circuitry that includes electrical terminals (such as an edge connector) for mating with corresponding terminals in the SFP receptacle, as well as a notch designed to hold a ferrule for mating with a connector of a passive optical cable, such as an MPO connector.

The mechanical shell is made up of molded upper and lower covers, which are joined together along an assembly line. Either the upper or lower cover includes a pair of elastic clips, which are molded integrally with the cover itself, typically using a three-part mold with suitable inserts to produce the desired shape. These clips receive and hold the connector of the optical cable when mated with the ferrule. Since the clips are molded as a part of the cover itself, the optical cable connector is held securely in place without the need for an additional cable retainer piece, as would otherwise be required.

In an alternative embodiment, the same mechanical shell can be used, without substantial modification, to contain the transceiver of an active optical cable. In this case, the ends of the optical fibers in the cable are permanently attached to the transceiver circuitry (via a suitable optical coupling element within the shell). For this purpose, the end of the optical cable that is inserted into the shell may have a harness, which is over-molded around the fibers at the end of the cable and has a lip that is inserted into and held by the existing notch in the mechanical shell. Using the same mechanical shell for both passive- and active-cable products saves significant tooling costs.

Figure 1:
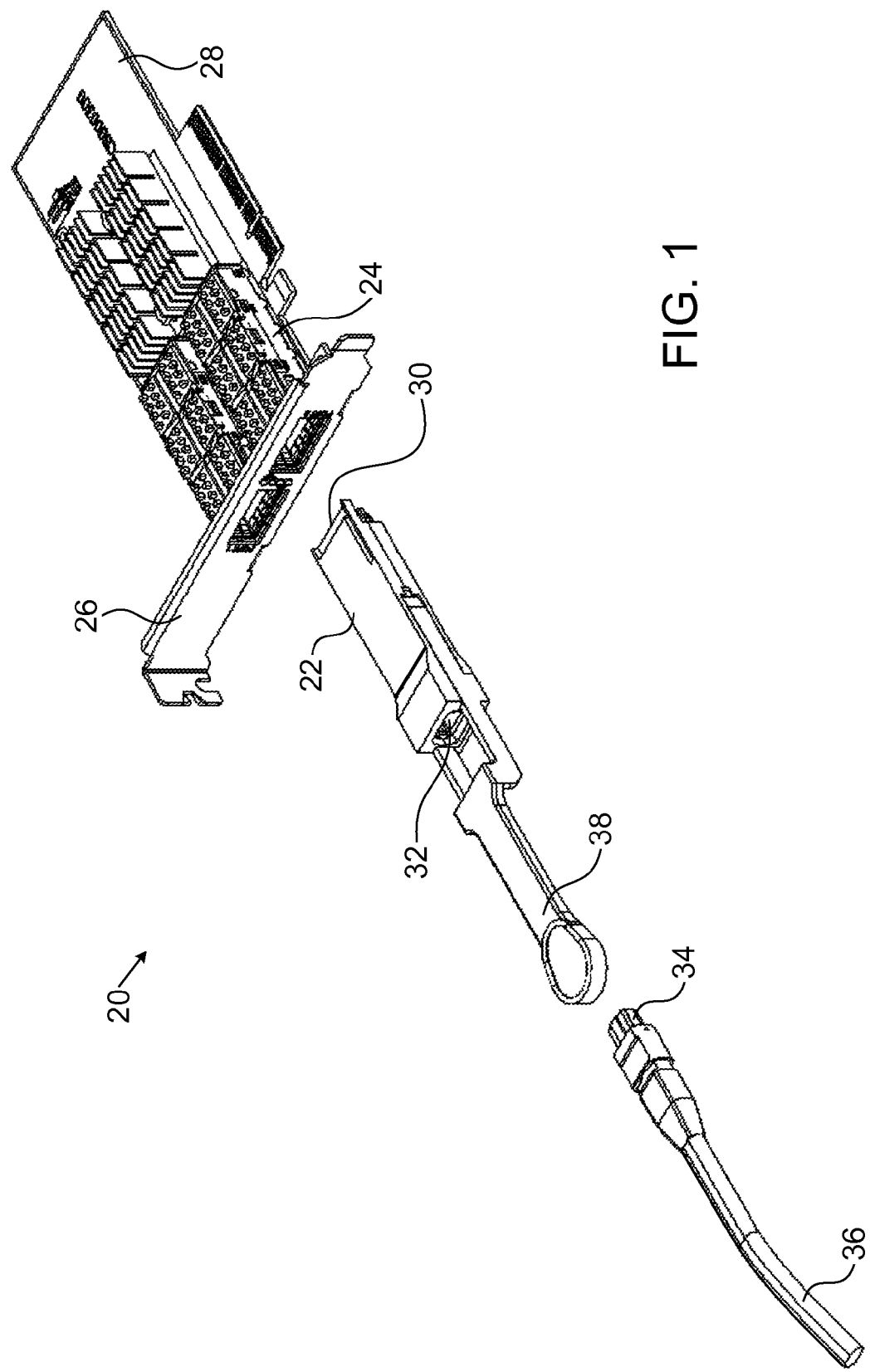
FIG. 1 is a schematic, pictorial illustration of an optical connection system, in accordance with an embodiment of the present invention.

FIG. 1 is a schematic, pictorial illustration of an optical connection system 20, in accordance with an embodiment of the present invention. System 20 is built around a QSFP transceiver module 22, which serves as an adapter device between a fiberoptic cable 36 and a QSFP receptacle 24 in a panel 26 of a piece of electronic equipment. Receptacle 24 is mounted on a circuit board within the equipment and transmits and receives electrical signals to and from circuit traces on the board. Module 22 comprises an edge connector 30 with terminals that mate with corresponding terminals (not shown) inside receptacle 24, in accordance with the QSFP standard. Module 22 may optionally comprise a push/pull-tab 38, to assist a user in removing the device from the receptacle.

At the end of module 22 facing away from panel 26, the module contains a built in socket 32, which is configured to receive a connector 34 of cable 36. In the pictured embodiment, connector 34 is an optical MPO connector, so that the connector and cable 36 function as a passive optical cable. Details of socket 32 are shown in the figures that follow.

Although the present embodiments are described, for the sake of clarity, with specific reference to QSFP transceiver modules, the principles of these embodiments may similarly be applied in devices compatible with substantially any of the SFP family of standards, as well as in other sorts of transceiver modules with similar properties. By the same token, devices of this sort are suitable to receive not only MPO connectors, but also, mutatis mutandis, other types of optical connectors.

Figure 2:
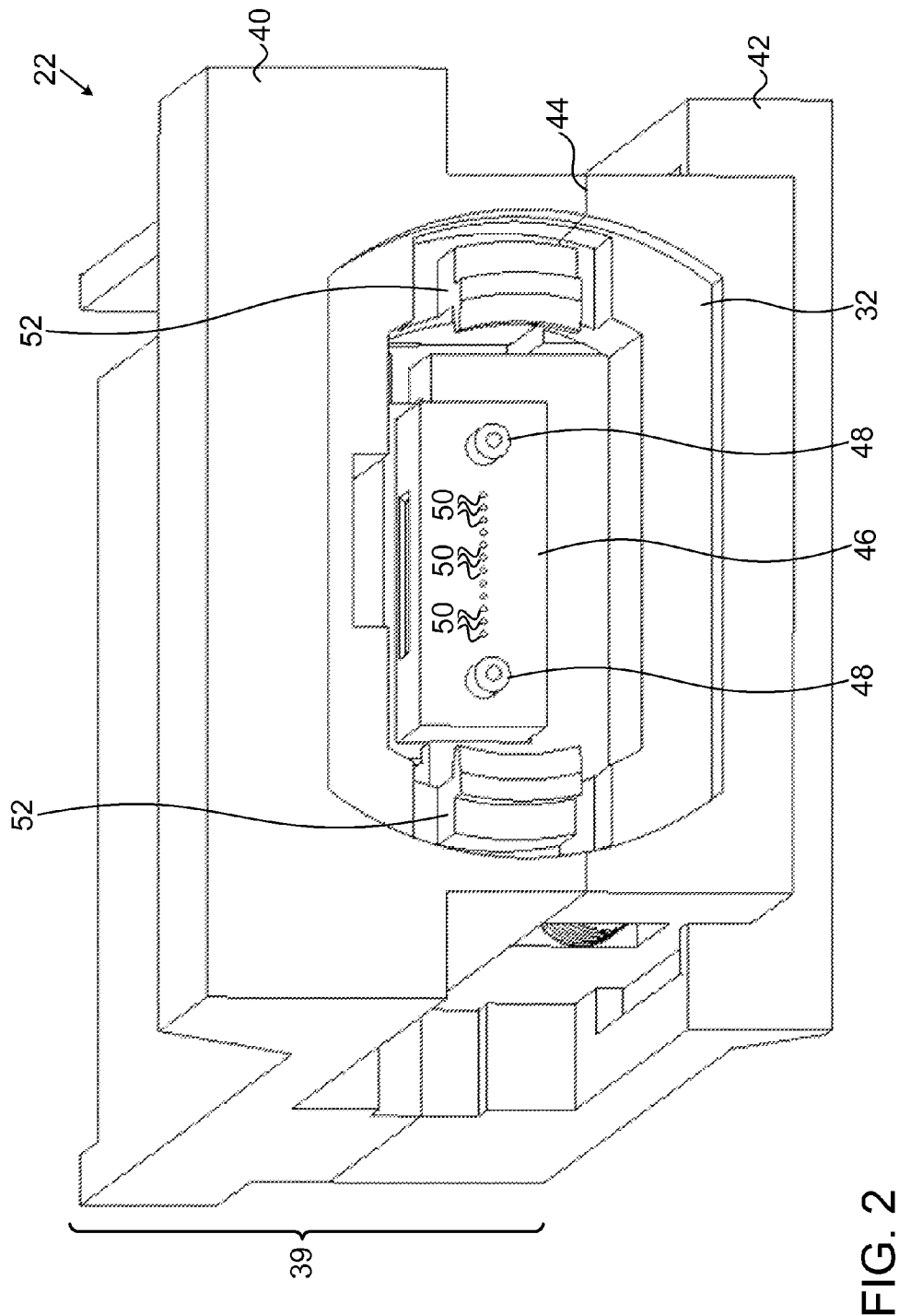
FIG. 2 is a schematic, pictorial view of a transceiver module, in accordance with an embodiment of the present invention.

FIG. 2 is a schematic, pictorial view of module 22, in accordance with an embodiment of the present invention. This figure specifically shows details of socket 32 and of components of module 22 that are associated with this socket. A mechanical shell 39 of module 22 comprises an upper cover 40 and a lower cover 42, which are joined together along an assembly line 44. Typically, covers 40 and 42 are produced by a molding process, such as metal die casting. The shapes of covers and 42 define socket 32. The terms "upper" and "lower" are used in relation to the covers of module 22 solely for the sake of convenience of description, to distinguish the two joined parts, and do not imply that module 22 can be used only in the pictured orientation. Rather, module 22 may be used in any desired orientation, depending on the orientation of receptacle 24.

Figure 3:
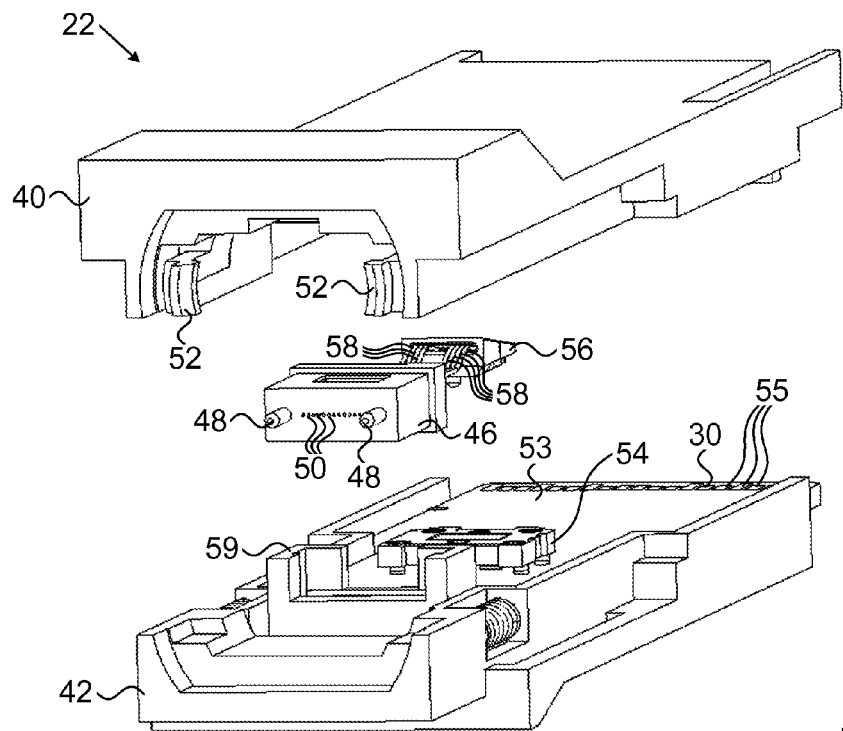
FIG. 3 is a schematic, exploded view of the transceiver module of FIG. 2, in accordance with an embodiment of the present invention.

Socket 32 contains a ferrule 46, which is inserted into a corresponding notch in lower cover 42, as shown in FIG. 3. Ferrule 46 is configured in accordance with the MPO standard, with alignment pins 48 that mate with corresponding elements in connector 34. Optical fiber ends 50 at predefined locations between pins 48 contact the corresponding ends in connector 34 of the fibers in cable 36.

Elastic clips 52 at either side of ferrule 46 are molded integrally with upper cover 40 and grasp connector 34 when it is inserted into socket 32, so that the fiber ends in the connector remain firmly in contact with fiber ends 50. For this reason, assembly line 44 is not centered across ferrule 46, but rather runs near the lower edge of the ferrule, as shown in FIG. 2. Alternatively, the elastic clips may be molded as part of lower cover 42, or as parts of both the upper and lower covers. Depending on the material from which cover 40 is molded, the thickness of clips 52 is chosen so that the clips have sufficient elasticity to bend outward as connector 34 is inserted between the clips into socket 32, while maintaining sufficient strength to hold the connector firmly in place once inserted. For example, in the embodiment illustrated in FIG. 2, assuming module 22 is molded from ZAMAK5 zinc alloy, clips 52 may be about 15-20 mm long and 8-10 mm wide, with a thickness of 1-2 mm at the thinnest, most elastic point. These dimensions, however, are presented by way of example, and methods of design that are known in the art may be used to produce modules and associated clips, in accordance with the principles of the present invention, having different properties and dimensions depending on application requirements.

FIG. 3 is a schematic, exploded view of module 22, in accordance with an embodiment of the present invention. The integral connection of clips 52 to upper cover 40 can be seen clearly in this figure. A notch 59 in lower cover 42 is shaped and sized to receive ferrule 46. Lower cover 42 also contains a circuit board 53 with terminals 55 of edge connector 30 at its far end. A transducer 54 mounted on board 53 serves as a circuit element for converting between the electrical communication signals on the board and the optical signals conveyed by cable 36. An optical module 56 mounted over transducer 54 couples the optical signals between the transducer and ribbons of optical fibers 58, which terminate at fiber ends 50.

The integral connection of clips 52 to upper cover 40 can also be seen clearly in FIG. 3. The complex shape of clips 52 cannot be produced by molding with a conventional two-piece mold, as the undercut design of the clips will make it impossible to release the upper cover from the mold after the die-cast metal (or injected plastic) has hardened. Instead, a novel multi-piece mold is required, as described below.

Figure 4:
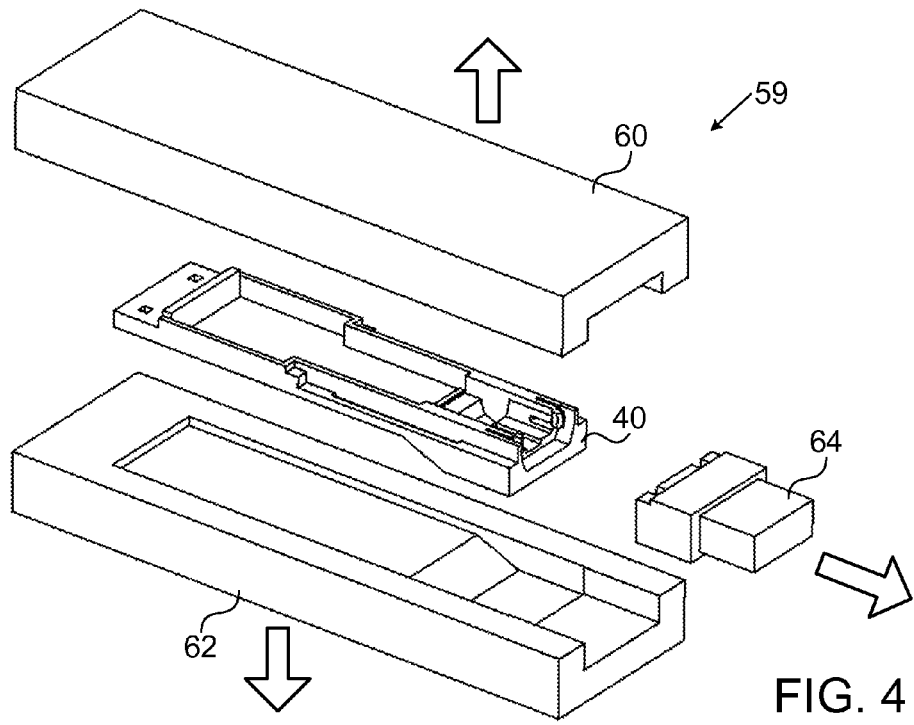
FIG. 4 is a schematic, exploded view of a mold used to produce a part of the shell of a transceiver module, in accordance with an embodiment of the present invention.

FIG. 4 is a schematic, exploded view of a mold 59 that is used to produce upper cover 40 of module 22, in accordance with an embodiment of the present invention. Mold 59 comprises an upper piece 60 and a lower piece 62, which define the overall shape of cover 40. An end piece (functioning as a side removal insert) is inserted between upper and lower pieces 60 and 62 during molding in order to define the outer shape of clips 52. After molding, pieces 60, 62 and 64 are released from cover 40 in the directions shown by the arrows in the figure.

Figure 5:
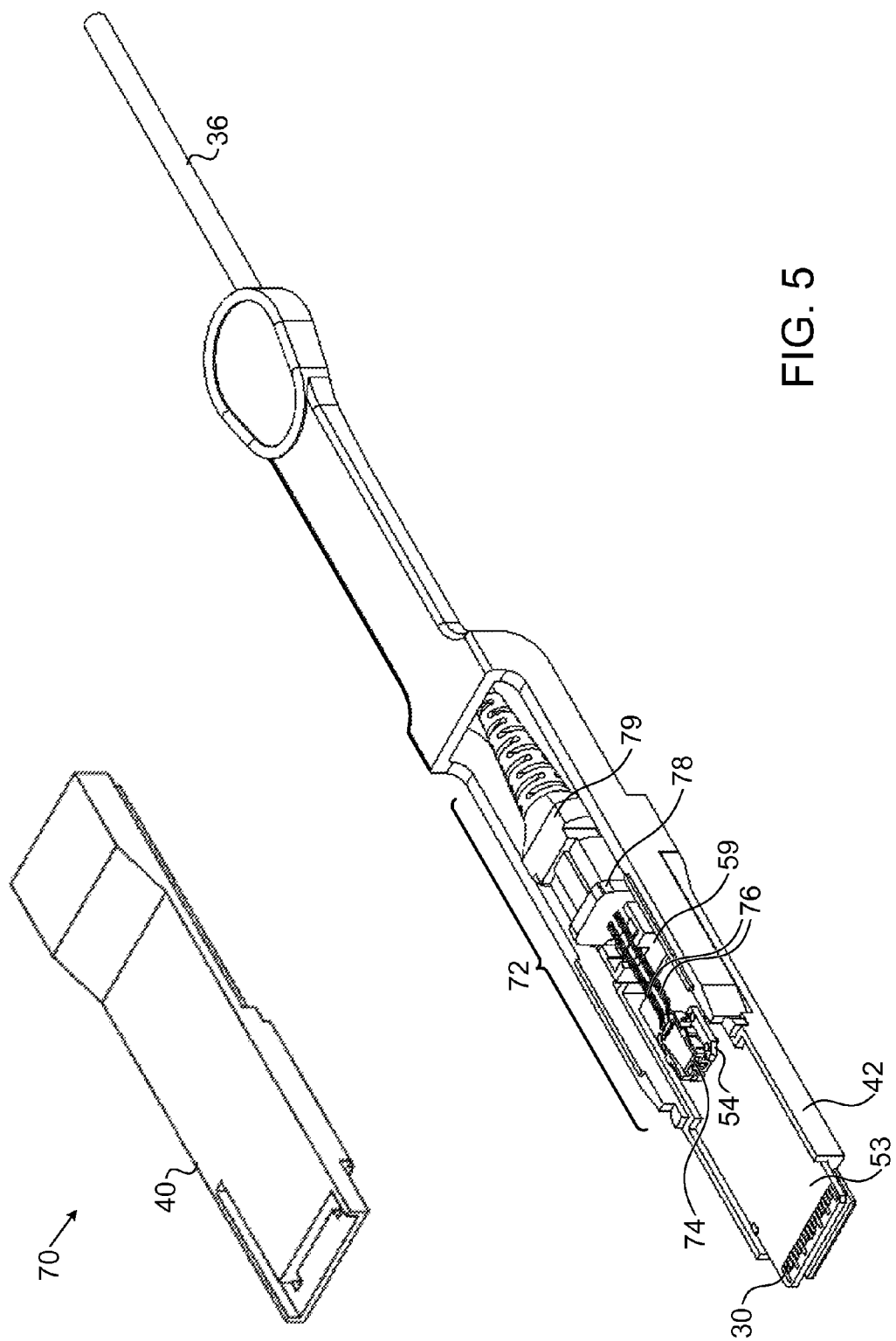
FIG. 5 is a schematic, exploded view of a transceiver module, in accordance with another embodiment of the present invention.

FIG. 5 is a schematic, exploded view of a transceiver module 70 for an active optical cable, in accordance with another embodiment of the present invention. This cable is termed "active" because cable 36 is permanently attached to module 70. Upper and lower covers 40 and 42 of module 70, however, are substantially identical to the upper and lower covers of module 22, i.e., the same molds and many of the same components of module 22 may be used in module 70, thus reducing tooling and production costs.

In the embodiment of FIG. 5, an end section 72 of optical cable 36 extends into the mechanical shell formed by covers 40 and 42. Optical fibers 76 extending from the end of the cable connect to an optical coupling element 74, which couple the optical communication signals between transducer 54 and the optical fibers. A harness 79 is molded around the fibers at the end of the cable and has a lip 78 that is inserted into and held by the same notch 59 that is used to hold the ferrule in the passive cable version.

Figure 6A:
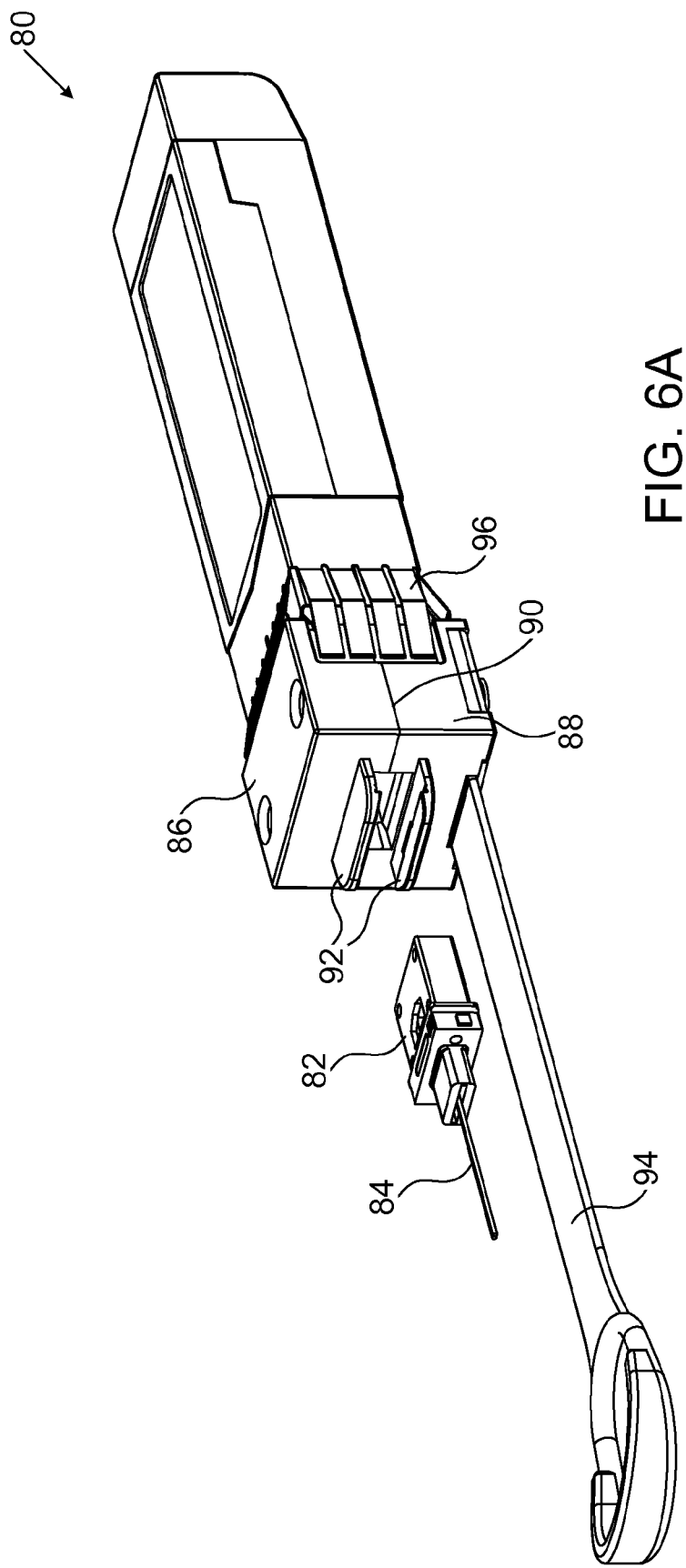
FIG. 6A is a schematic, pictorial view of a transceiver module, in accordance with an alternative embodiment of the present invention.
Figure 6B:
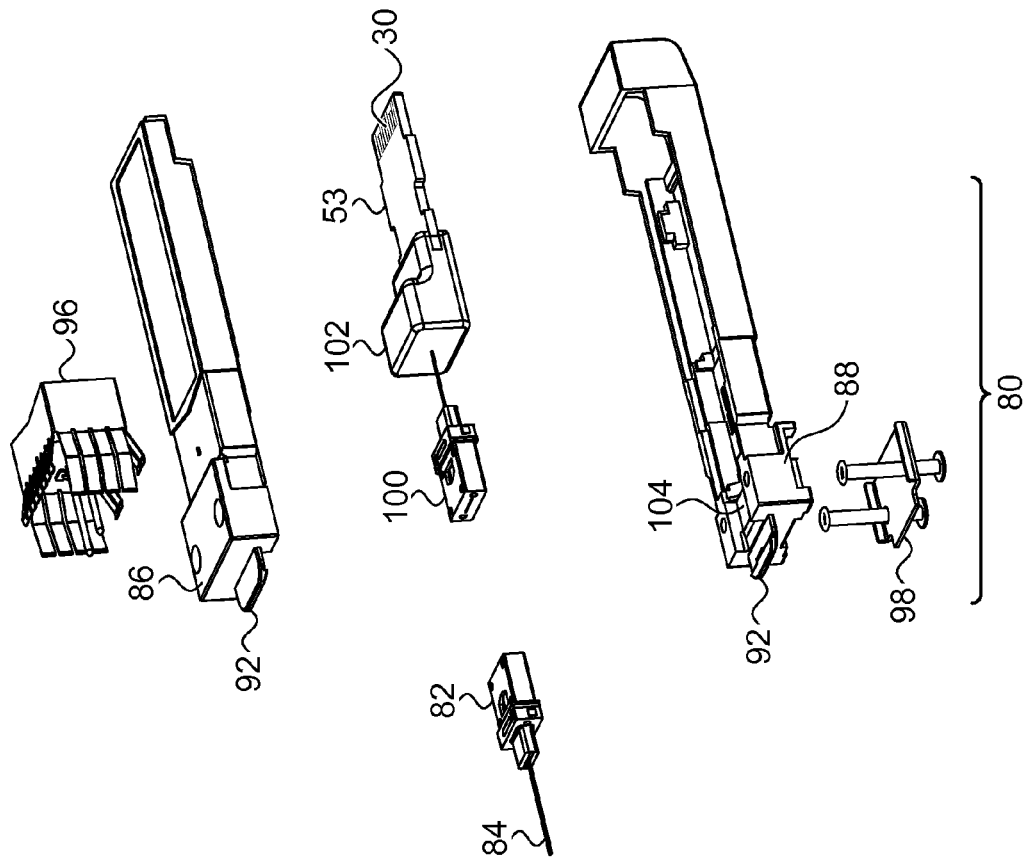
FIG. 6B is a schematic, exploded view of the transceiver module of FIG. 6A.
Figure 6B:
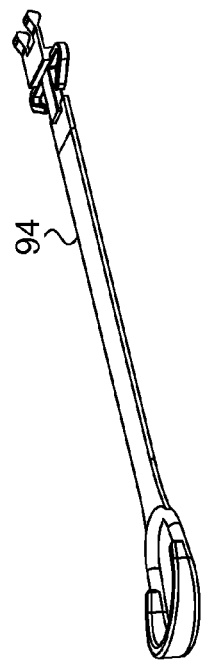

FIGS. 6A and 6B schematically illustrate a transceiver module 80, in accordance with an alternative embodiment of the present invention. FIG. 6A is a pictorial view, while FIG. 6B an exploded view. Module 80 is similar in its principles of operation and mode of production to module 22, as described above, except that the form factor and electrical connections of module 80 conform to the SFP+ specification (and module 80 is thus designed to be inserted into an SFP+ receptacle—not shown in the figures—rather than QSFP as in the case of module 22). Module 80 contains a ferrule 100 that is configured to mate with a connector 82 of a passive optical cable 84, which in this case is an MT-type connector, as defined by the IEC-61754-5 standard of the International Electrotechnical Commission).

The mechanical shell of module 80 comprises molded upper and lower covers 86 and 88, which are joined together along an assembly line 90. A pair of elastic clips 92 are molded integrally with covers 86 and 88 (one clip as part of the upper cover, and the other as part of the lower cover). Clips 92 receive and hold connector 82 when mated with ferrule 100, which is held in a notch 104 in the shell. Contact fingers 96 fit around the outer surface of module 80 in order to ensure a positive ground contact with the SFP+ receptacle. A locking assembly 98 holds covers 86 and 88 together and fastens a push/pull tab 94 to the module.

Inside module 80, ferrule 100 connects via optical fibers to a circuit block 102 held within the mechanical shell. Block 102 contains circuit board 53 with edge connector 30, which mates with corresponding terminals of the receptacle.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A communication device, comprising:
   a mechanical shell, which is configured to be inserted into a Small Form-Factor Pluggable (SFP) receptacle, contains a notch configured to hold a ferrule for mating with a connector of a passive optical cable and defines a socket configured for insertion of the connector therein, wherein the mechanical shell comprises molded upper and lower covers, which are joined together along an assembly line and which comprise a pair of elastic clips, which are molded integrally with at least one of the upper and lower covers and are configured to receive and hold the connector in the socket when mated with the ferrule; and
   circuitry within the shell, comprising electrical terminals configured to mate with corresponding terminals of the receptacle.

2. The device according to claim 1, wherein the SFP receptacle is a QSFP receptacle.

3. The device according to claim 1, wherein the SFP receptacle is an SFP+ receptacle.

4. The device according to claim 1, wherein the connector of the passive optical cable is a multiple-fiber push-on (MPO) connector.

5. The device according to claim 1, wherein the connector of the passive optical cable is an MT-type connector.

6. The device according to claim 1, wherein the circuitry comprises at least one circuit element for converting between electrical communication signals on the electrical terminals and optical communication signals in the optical cable.

7. The device according to claim 6, and comprising an optical cable, which has an end that extends into the mechanical shell and which comprises:
   optical fibers;
   an optical coupling element, connected to the optical fibers and configured to couple the optical communication signals between the at least one circuit element and the optical fibers; and
   a harness, which is molded around the fibers at the end of the optical cable and has a lip configured to be inserted into the notch in the mechanical shell.

8. The device according to claim 1, wherein the at least one of the upper and lower covers with the pair of elastic clips is die-cast using a three-part mold.

9. The device according to claim 1, wherein the upper and lower covers have respective shapes which define the socket when the upper and lower covers are joined together.

10. The device according to claim 1, wherein the mechanical shell is configured to hold the connector in the socket such that optical fiber ends in the connector of the optical cable contact corresponding optical fiber ends in the ferrule.

11. The device according to claim 1, wherein the pair of elastic clips is configured to bend outward when the connector is inserted between the clips and into the socket and to hold the connector within the socket after the connector is inserted into the socket.

12. A method for producing a communication device, the method comprising:
   molding upper and lower covers of a mechanical shell, which is configured to be inserted into a Small Form-Factor Pluggable (SFP) receptacle, containing a notch configured to hold a ferrule for mating with a connector of a passive optical cable and defining a socket configured for insertion of the connector therein and comprising a pair of elastic clips, which are molded integrally with at least one of the upper and lower covers and are configured to receive and hold the connector in the socket when mated with the ferrule;
   assembling circuitry, comprising electrical terminals configured to mate with corresponding terminals of the receptacle, within the shell; and joining the upper and lower covers together along an assembly line.

13. The method according to claim 12, wherein the SFP receptacle is a QSFP receptacle.

14. The method according to claim 12, wherein the SFP receptacle is an SFP+ receptacle.

15. The method according to claim 12, wherein the connector of the passive optical cable is a multiple-fiber push-on (MPO) connector.

16. The method according to claim 12, wherein the connector of the passive optical cable is an MT-type connector.

17. The method according to claim 12, wherein the circuitry comprises at least one circuit element for converting between electrical communication signals on the electrical terminals and optical communication signals in the optical cable.

18. The method according to claim 17, and comprising:
inserting optical fibers from an end of an optical cable into the mechanical shell and which comprises:
connecting the optical fibers to an optical coupling element so as to couple the optical communication signals between the at least one circuit element and the optical fibers; and
inserting a lip of a harness, which is molded around the fibers at the end of the optical cable, into the notch in the mechanical shell.

19. The method according to claim 12, wherein molding the upper and lower covers comprises die-casting the one of the upper and lower covers with the pair of elastic clips using a three-part mold.

20. The method according to claim 12, wherein joining the upper and lower covers together comprises defining the socket by joining the upper and lower covers, the respective shapes of which define the socket when joined together.

21. The method according to claim 12, wherein the mechanical shell is configured to hold the connector in the socket such that optical fiber ends in the connector of the optical cable contact corresponding optical fiber ends in the ferrule.

22. The method according to claim 12, wherein the pair of elastic clips is configured to have sufficient elasticity to bend outward when the connector is inserted between the clips and into the socket.

* * * * *